United States Patent [19]

Mangan et al.

[11] 4,249,068

[45] Feb. 3, 1981

[54] METHOD AND APPARATUS FOR CONTROLLING HEAT ENERGY OF A BONDING TRANSFORMER

[75] Inventors: John P. Mangan, Iselin; Edward D. Riordan, South Somerville, both of N.J.

[73] Assignee: Joyal Products, Inc., Linden, N.J.

[21] Appl. No.: 946,639

[22] Filed: Sep. 28, 1978

[51] Int. Cl.³ .............................................. H05B 1/02
[52] U.S. Cl. .................................................. 219/497
[58] Field of Search ............... 219/108, 110, 497, 498, 219/499; 336/205

[56] References Cited

U.S. PATENT DOCUMENTS

| | | | |
|---|---|---|---|
| 2,489,867 | 4/1949 | D'Orio | 336/205 |
| 3,746,825 | 7/1973 | Pfaffmann | 219/110 |
| 3,778,581 | 12/1973 | Denny | 219/110 |
| 3,932,725 | 1/1976 | Ganowski | 219/110 |
| 4,001,539 | 1/1977 | Franchi et al. | 219/110 |
| 4,079,225 | 3/1978 | Warner | 219/110 |

*Primary Examiner*—C. C. Shaw
*Attorney, Agent, or Firm*—Lerner, David, Littenberg & Samuel

[57] ABSTRACT

The present invention provides a method and apparatus for controlling the amount of heat energy supplied by a bonding transformer to coil windings to heat the windings to a predetermined temperature level for fusing the windings into an integral mass. This is accomplished by continuously monitoring the current level in the secondary windings of the bonding transformer and comparing the signal produced with a signal preset in a comparator, which preset signal corresponds to the heat energy required by the coil windings to heat them to the predetermined temperature level. The comparator then operates to deactivate the bonding transformer when the monitored signal corresponds to the predetermined temperature level desired in the coil windings.

10 Claims, 1 Drawing Figure

METHOD AND APPARATUS FOR CONTROLLING HEAT ENERGY OF A BONDING TRANSFORMER

FIELD OF THE INVENTION

The present invention relates generally to a method and apparatus for controlling the amount of heat energy supplied by a bonding transformer to coil windings, such as armature or stator windings, or the like. More particularly, the heat energy is controlled to heat the coil windings to a predetermined temperature level in order that the bonding coat of thermoplastic or thermoset material surrounding the wires of the coil windings melts and fuses the windings into an integral mass.

BACKGROUND OF THE INVENTION

Bonding transformers have been employed in the prior art to supply heat energy to coil windings in order to heat them to a temperature level, at which the bonding coat surrounding the wires of the coil windings melts and fuses the windings into an integral mass. Typically, the bonding coat is formed of a thermoplastic or thermoset material. Such material may melt and fuse at a temperature level of approximately 200° C. Accordingly, in order to fuse the coil windings with the required quality, they must be heated as closely as possible to this temperature level. However, because of the variations between coil windings and the variations in the resistance of the wires of the coil windings, if the same amount of heat energy is applied to each coil winding, then some of the windings will be heated to too high or too low of a temperature level. This creates a problem because if the windings are heated to too high of a temperature level, the bonding coat may begin to vaporize and be destroyed instead of fusing. In addition, if a sufficiently high temperature is reached, the insulation layer under the bonding coat may even be detrimentally affected. For example, if the required melting temperature of the bonding coat is approximately 200° C., and too much heat is applied by the bonding transformer so that the temperature of the particular coil winding is raised to 220° C. or 240° C., then the bonding coat and/or insulation layer may be detrimentally affected. On the other hand, if insufficient heat energy is supplied by the bonding transformer to the coil windings, then the bonding coat will not be melted sufficiently to fuse the windings as desired. Accordingly, it can be seen that an accurate control arrangement is required for controlling the amount of heat energy supplied by the bonding transformer to the coil windings so that they are heated to a predetermined temperature level, at which the bonding coat will melt and fuse the windings into an integral mass, independent of the variations between the various windings.

Therefore, it is an object of the present invention to provide a method and apparatus which overcomes the aforesaid problems. Specifically, it is within the contemplation of the present invention to provide an improved method and apparatus for controlling the amount of heat energy supplied by a bonding transformer to coil windings to accurately heat the coil windings to a predetermined temperature level to melt and fuse the windings into an integral mass without detrimentally affecting the bonding coat and/or insulation layer of the coil windings.

It is also an object of the present invention to provide an improved control arrangement for continuously monitoring and sensing the changing current in the bonding transformer as a function of the changing temperature and resistance of the coil winding being heated, while maintaining the voltage in the transformer at a constant level, in order to control the amount of heat energy supplied by the bonding transformer to the coil windings.

SUMMARY OF THE INVENTION

Briefly, in accordance with the principles of the present invention, an improved method and apparatus is provided for controlling the amount of heat energy supplied by a bonding transformer to coil windings, such as armature or stator windings, or the like. The heat energy is controlled to heat the coil windings to a predetermined temperature level in order that the bonding coat surrounding the wires of the coil windings melts and fuses the windings into an integral mass. This is accomplished in the present invention by taking advantage of the fact that as the temperature of the coil windings being heated increases, its resistance increases, and for a preset voltage level in the bonding transformer, the current will decrease proportionately to the increasing resistance. The control arrangement of the present invention employs a sensing coil to sense and continuously monitor the changing current in the secondary windings of the bonding transformer as a function of the changing temperature and resistance of the coil windings being heated, while maintaining the voltage level in the secondary windings of the transformer substantially constant. The sensing coil produces an AC voltage signal proportional to the sensed current, and this voltage signal is rectified to DC and supplied to a comparator which is preset with a predetermined reference voltage indicative of the desired temperature level for performing an acceptable fusing operation. The comparator electronically compares the monitored DC voltage signal to the preset reference voltage, and when they are equal, the comparator actuates an on-off logic control to turn off the bonding transformer.

As will be understood, as the coil windings are heated by the bonding transformer, the temperature of the windings increases, and therefore, the resistance of the windings also increases. As a result, for a preset voltage in the secondary windings of the bonding transformer, the current sensed by the sensing coil decreases proportionately to the increasing resistance, and the voltage signal produced by the sensing coil also decreases proportionately and is sent to the comparator. When the decreasing voltage signal reaches the preset reference voltage of the comparator, the bonding transformer is turned off. Therefore, by continuously sensing the decreasing current within the secondary windings of the bonding transformer and supplying it to the comparator and on-off control, the coil windings are heated to the desired temperature level for fusing the bonding coat of the coil windings into an integral mass.

As stated above, the control circuit of the present invention includes a comparator which is preset with a reference voltage. This reference voltage is representative of a coil factor for an ideal or nominal set of coil windings to be heated. In addition, the control circuit of the present invention includes a tap setting in the bonding transformer having a plurality of settings which may be selected to control and preset the voltage level in the secondary windings of the transformer. This controls the time period that the bonding transformer is on to thereby control the heat energy supplied to the coil windings being fused in order to heat the windings to the predetermined temperature level for fusing. Also, the control circuit of the present invention includes an amplifier, having a plurality of gain settings which may be selected to insure that the initial DC voltage signal emitted by the sensing coil does not saturate the amplifier. The basis for selecting each of the foregoing will be explained below.

Advantageously, as a result of the present invention, a simple control arrangement is provided for controlling the amount of heat energy supplied by a bonding transformer to coil windings to heat them to a predetermined temperature level for fusing. As the control circuit continuously monitors the current in the secondary windings of the bonding transformer as a function of the changing temperature and resistance of the winding being heated, it provides an accurate and simple manner of controlling the heat energy supplied to the coil winding to prevent underheating or overheating of the coil winding and to heat it to the required temperature level independent of variations between the various coil windings.

BRIEF DESCRIPTION OF THE DRAWINGS

Further objects, features, and advantages of the present invention will become apparent upon the consideration of the following detailed description of a presently-preferred embodiment when taken in conjunction with the accompanying drawing, wherein.

DETAILED DISCUSSION OF PREFERRED EMBODIMENT OF THE INVENTION

Figure 1:
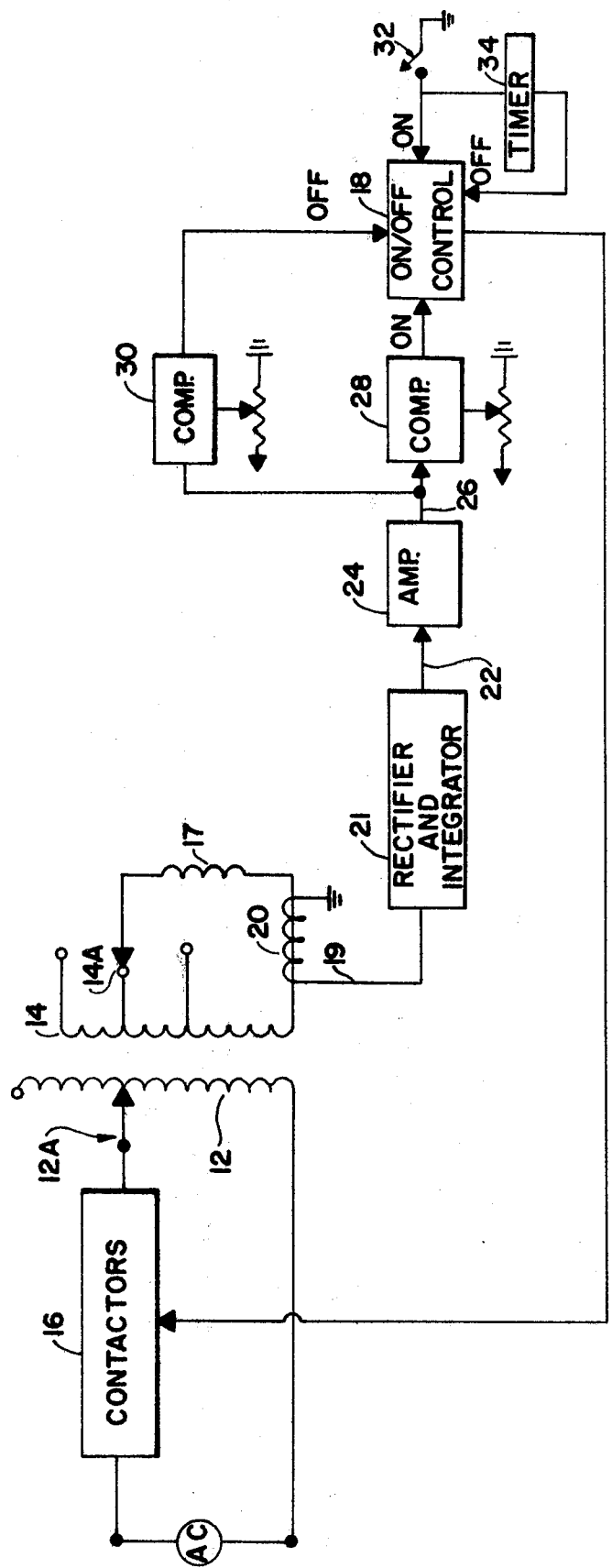
FIG. 1 is a schematic diagram of the control circuit embodying the present invention.

Referring now to FIG. 1, there is shown a preferred embodiment of the control circuit of the present invention. The bonding transformer 10 includes primary windings 12 and secondary windings 14, with the primary windings being supplied with power from an AC source. The primary windings 12 of the bonding transformer are actuated on and off by a set of contactors 16 which are opened and closed by an on-off logic control circuit 18 in a manner to be explained. The coil windings to be bonded are schematically represented at 17 and are shown connected in series with the secondary windings 14.

The bonding transformer 10 includes tap settings having a plurality of settings which may be selected to control and preset the voltage level in the secondary windings 14 of the bonding transformer 10. This controls the time period that the bonding transformer is on to control the heat energy supplied to the windings being fused in order to heat the windings to the predetermined temperature level for fusing. Preferably, the primary windings 12 include a tap switch 12a which is movable to eleven different taps on the primary windings. In addition, the secondary windings 14 include a tap switch 14a which is movable to three different tap points on the secondary windings 14. In this manner, tap switch 12a can be moved to the desired tap setting to select the desired voltage level in the primary windings which will control and set the desired voltage level in the secondary windings 14 of the bonding transformer. The manner of computing and selecting the voltage setting of the bonding transformer will be explained below.

A sensing coil 20 is employed to continuously monitor and sense the changing current level within the secondary windings 14 of the bonding transformer 10 during the heating operation, as a function of the changing temperature and resistance of the windings being heated, while maintaining the selected voltage constant in the secondary windings 14. Accordingly, while the bonding transformer 10 is supplying heat energy to fuse a coil winding, the temperature and, therefore, the resistance of the coil winding will increase so that the current being sensed in the secondary windings 14 will decrease proportionately. In response, the sensing coil 20 emits an AC voltage signal 19 which corresponds to the current value being sensed in the sensing coil 20. Signal 19 is supplied to a rectifier and integrator 21 which converts it to a DC signal 22. Signal 22 is supplied to an amplifier 24 in which a particular gain setting has been selected to insure that the initial AC voltage signal emitted by sensing coil 20 does not saturate the amplifier. The manner of selecting the gain setting for the amplifier will be explained below.

Amplifier 24 supplies an amplified voltage signal 26 to a comparator 28 which has been preset to a predetermined voltage reference level which is dependent on the coil factor of a nominal or ideal coil winding and which is indicative of the desired temperature level for fusing the coil winding. The manner of selecting this coil factor will also be explained below. When voltage signal 26 decreases to the preset reference voltage in comparator 28, comparator 28 emits a signal to the on-off logic control circuit 18 for the bonding transformer 10 to open the contactors 16 and shut off the supply of heat energy to the coil winding being heated. As a result, the coil winding will have received sufficient heat energy to heat the coil winding to the predetermined temperature level required for fusing the coil winding into an integral mass.

By continuously monitoring and sensing the changing current level in the secondary windings 14 of the bonding transformer 10, a continuous current reading is provided which corresponds to the increasing resistance and temperature level of the coil windings being heated. Thus, as soon as the voltage signal to comparator 28 reaches the lower preset reference voltage signal, the bonding transformer is shut off. As the reference voltage is indicative of the desired temperature level for fusing, an accurate control arrangement is provided for controlling the amount of heat energy supplied by the bonding transformer 10 to the coil windings so that they are heated to the predetermined temperature level for proper fusing.

Referring again to FIG. 1, in the preferred embodiment, a comparator 30 is provided for comparing the initial current signal sensed by sensing coil 20 to a preset current value which is representative of a current value indicating a short in the circuit. Accordingly, if the signal 26 emitted by amplifier 24 is too high, this will be sensed by comparator 30, and it will operate the on-off logic control circuit 18 to open the contactors 16 and shut off the bonding transformer 10 before the circuit can be damaged.

As will also be noted from FIG. 1, a start switch 32 is provided for signaling the on-off logic control circuit 18 for turning on the bonding transformer 10 when a coil winding is to be heated. However, as a further safety feature, a timer 34 is provided which is preset with a predetermined time period which corresponds to the time it should take to fuse any of the coil windings being heated. Accordingly, if the bonding transformer 10 is on for longer than the predetermined time limit set in timer 34, timer 34 will operate to send a signal to on-off logic control circuit 18 to open contactors 16 and shut off the bonding transformer 10. This is provided in case sensing coil 20 or any one of the other components of the circuit is not properly functioning and is not sending a representative signal to the comparator 28.

As stated above, the control circuit of the present invention includes a tap setting on the bonding transformer for controlling the output voltage of the secondary windings of the bonding transformer. In addition, the control circuit of the present invention includes amplifier 24 having a plurality of gain settings which may be selected to insure that the initial DC voltage signal 22 emitted by the sensing coil 20 does not saturate the amplifier 24. In addition, the circuit of the present invention includes a comparator 28 which is preset with a reference voltage representative of a coil factor for an ideal or nominal set of coil windings to be heated. The basis for selecting each of the foregoing will now be explained.

In order to select the output voltage of the secondary windings of the bonding transformer ($V_{TRANSF}$), the voltage for a nominal or ideal winding must be determined. In order to determine the $V_{TRANSF}$ required for a particular nominal coil, the impedance and current of the nominal winding must be computed. Since, $$R_{Elevated \atop Temperature} = R_{Initial \atop Temperature} (1 + \alpha \Delta T)$$

this equation can be used to determined the resistance of the nominal winding at the desired elevated temperature. First, the initial resistance of the winding is determined in any suitable manner. The coefficient alpha for the particular material is known, and the desired temperature differential is also known. For example, the ambient temperature of the windings may be approximately 20° C., and it is desired to heat the windings to 200° C. for fusing. Accordingly, the temperature differential would be 180° C. Once the resistance ($R_{Elevated \atop Temperature}$) is determined, then the impedance of the nominal coil winding at the elevated temperature can be determined. For stator or armature windings, the capacitive effect is negligible and need not be considered. In addition, the inductance of the windings is a physical property of the windings and is a substantially constant factor which does not change over the temperature range from 20° C. to 200° C. being considered. Accordingly, the impedance may be determined by the following equation:

$$Z = \sqrt{R^2_{Elevated \atop Temperature} + X_L^2}$$

where $X_L$=the inductance of the winding. Once the impedance is computed, it is only necessary to determine the current for a nominal coil winding in order to compute the voltage for the nominal coil windings so as to select the proper voltage tap setting on the bonding transformer 10.

More particularly, in order to determine the current, this is computed by first utilizing the following equation:

$$Q = mc\Delta T$$

where Q represents the quantity of heat, m represents the mass of the material, c the specific heat of the material, and $\Delta T$ the temperature differential. Once the heat energy required is determined in terms of calories, it can be converted to electrical units of energy, such as watt-seconds or joules. The number of seconds desired to perform the bonding operation is decided, and then the number of watts is computed. Based on this, the current can be determined by the following equation:

$$I = \sqrt{\frac{P}{R_{Elevated. \atop Temperature}}}$$

where P equals the power required in terms of watts per second and I the current in terms of amps. Once the current is determined, this is multiplied by the impedance to compute the voltage required per second by the bonding transformer to heat a nominal winding to the desired elevated temperature. This voltage is employed to select the voltage tap setting of the transformer 10.

As noted above, amplifier 24 includes a plurality of gain settings which may be selected to insure that the initial DC voltage signal 22 emitted by the sensing coil 20 does not saturate the amplifier. In order to select the proper gain setting, the following calculations are made. The initial resistance of the coil winding before it is heated is determined. This is divided into the voltage level to be set for the secondary windings of the bonding transformer to compute approximately what the initial current sensed by sensing coil 20 will be. Also, the approximate value of the initial AC voltage signal 19 emitted by the sensing coil 20 can be computed. As these current and voltage values will be the highest at the beginning of the heating process, amplifier 24 can be set to a point slightly higher than the expected value of the initial DC voltage signal to be emitted by the sensing coil. As a result, this will prevent amplifier 24 from being saturated by the initial DC voltage signal. In addition, as will be understood, if the gain setting of amplifier 24 is set too high, the bonding transformer 10 will be on for a longer period of time than necessary, since it will take longer for the voltage signal 22 to reach the preset reference voltage in comparator 28. Accordingly, it is important that amplifier 24 be set at a gain setting which most closely approximates the expected initial AC voltage signal 19 for the nominal coil winding to be heated.

As also pointed out above, the reference voltage of comparator 28 is preset dependent upon a coil factor or winding factor for a nominal or ideal set of coil windings to be bonded. The coil factor is based on a number of variables, such as the resistance of the wire in the windings, and the number of turns in the windings. It is also dependent upon a number of electrical variables of the bonding transformer and the circuit itself. The coil factor is set into comparator 28 by merely adjusting a potentiometer to the desired preset reference voltage. This reference voltage is indicative of the predetermined temperature level required for fusing the coil winding.

As will be understood, when the actual coil winding being heated has a resistance which is much higher than the resistance of a nominal coil winding, it will not take as much heat energy to heat it to the desired temperature level for fusing. Accordingly, the bonding transformer 10 will be energized for a shorter period of time as compared to heating a coil winding having a resistance close to or lower than the resistance value of a nominal coil winding.

As will be understood from the foregoing, for a group of coil windings to be bonded, the computations indicated above are made for a nominal or ideal coil winding. Then, the necessary settings are made in the control circuit of the present invention which includes setting the voltage level at the bonding transformer so that the output voltage of the secondary windings of the bonding transformer corresponds to the computed voltage required to heat the nominal coil winding to the desired elevated temperature. In addition, amplifier 24 is set at the selected gain setting based on a computation of the expected maximum AC voltage signal 22 to be initially emitted by sensing coil 20. Also, comparator 28 is preset with a reference voltage which corresponds to the coil factor for a nominal coil winding within the group. Then, the entire group of coil windings can be bonded without any further adjustments or settings on the control apparatus, and each of the coil windings will be supplied a sufficient amount of heat energy by the bonding transformer 10 to heat it to the desired temperature level for fusing, independent of variations between the various coil windings within the group and independent of how great the difference is between the actual coil winding being heated and the computed nominal coil. As a result, the control circuit of the present invention prevents underheating or overheating of the coil windings by the bonding transformer and thereby provides a quality fusing operation independent of the variations between the various coil windings.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for controlling the amount of heat energy supplied to a workpiece including coil windings by a bonding transformer having primary and secondary windings to heat said coil windings to a predetermined temperature level for fusing said coil windings into an integral mass, comprising means for connecting said workpiece in series to the secondary windings of said bonding transformer, means for continuously and directly monitoring the current level delivered to said workpiece to provide a signal representative of the current in said workpiece, means for presetting the output voltage of said bonding transformer to a substantially constant value while said current level is being monitored, means for providing a reference signal level corresponding to a current level in said workpiece at which said coil windings will manifest a desired temperature, comparator means for receiving said signal from said monitoring means and for comparing said signal to said reference signal which corresponds to said desired temperature level, and means responsive to an output of said comparator means indicative that said signal from said monitoring means is no longer greater than said reference signal level for controlling said bonding transformer to terminate a further application of current to said workpiece.

2. Apparatus in accordance with claim 1 wherein said presetting means includes adjustable tap settings on said bonding transformer.

3. Apparatus in accordance with claim 1 further including an amplifier for amplifying said representative signal provided by said monitoring means, said amplifier including a plurality of gain settings to establish the operation thereof within a linear range and avoid saturation.

4. Apparatus in accordance with claim 1 wherein said monitoring means includes a sensing coil for sensing the current level in the secondary windings of said bonding transformer.

5. Apparatus in accordance with claim 1 wherein said comparator means includes a potentiometer for presetting a reference voltage signal.

6. Apparatus in accordance with claim 1 further including a timer preset for a time period and operative to deactivate said bonding transformer at the end of said time period.

7. Apparatus in accordance with claim 1 further including a second comparator preset with a threshold condition corresponding to current value which is undesirably large in application to said workpiece, said second comparator being operative to deactivate said bonding transformer if said sensed current level reaches said current value.

8. The apparatus according to claim 1 wherein said reference signal level is calculated on the basis of the decrease in current flow through said workpiece in response to an increase in resistance thereof as said coil heats to said predetermined temperature level.

9. A method for controlling the amount of heat energy supplied to a workpiece including coil windings by a bonding transformer having primary and secondary windings to heat said coil windings to a predetermined temperature level for fusing said coil windings into an integral mass, comprising the steps of connecting said workpiece in series to the secondary windings of said bonding transformer, continuously and directly monitoring the current level delivered to said workpiece to provide a signal representative of the current in said workpiece being heated, presetting the output voltage of said bonding transformer to a substantially constant value while said current level is being monitored, said output voltage corresponding to the voltage for a nominal coil winding, providing a reference signal level corresponding to a current level in said workpiece at which said coil windings will manifest a desired temperature, supplying said monitored signal to a comparator and comparing said signal to said reference signal which corresponds to said desired temperature level, and terminating current supplied to said workpiece by said bonding transformer when said monitored signal no longer exceeds said reference signal level representing said temperature level desired in said coil windings.

10. A method in accordance with claim 9 further including the step of amplifying said monitored signal before it is supplied to said comparator.

* * * * *